(12) United States Patent
Omori et al.

(10) Patent No.: US 9,812,258 B2
(45) Date of Patent: Nov. 7, 2017

(54) CERAMIC ELECTRONIC COMPONENT

(71) Applicant: MURATA MANUFACTURING CO., LTD., Nagaokakyo-shi, Kyoto-Fu (JP)

(72) Inventors: Takashi Omori, Nagaokakyo (JP); Seiji Koga, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 16 days.

(21) Appl. No.: 14/484,389

(22) Filed: Sep. 12, 2014

(65) Prior Publication Data

US 2014/0376155 A1 Dec. 25, 2014

Related U.S. Application Data

(63) Continuation of application No. PCT/JP2013/053691, filed on Feb. 15, 2013.

(30) Foreign Application Priority Data

Mar. 19, 2012 (JP) .................................. 2012-061568

(51) Int. Cl.
*H01G 4/008* (2006.01)
*H01G 4/30* (2006.01)
(Continued)

(52) U.S. Cl.
CPC .............. *H01G 4/008* (2013.01); *H01G 4/228* (2013.01); *H01G 4/232* (2013.01); *H01G 4/2325* (2013.01); *H01G 4/30* (2013.01)

(58) Field of Classification Search
CPC ............ H01G 4/30; H01G 4/232; H01G 4/008
(Continued)

(56) References Cited

U.S. PATENT DOCUMENTS 6,124,769 A * 9/2000 Igarashi ................. H01C 1/142
333/172
7,558,047 B2 * 7/2009 Ukuma ................ H01G 4/2325
361/305

(Continued)

FOREIGN PATENT DOCUMENTS

CN          101189693 A      5/2008
JP          9-190950         7/1997
(Continued)

OTHER PUBLICATIONS

PCT/JP2013/053691 Written Opinion dated Feb. 27, 2013.

*Primary Examiner* — Eric Thomas
*Assistant Examiner* — Arun Ramaswamy
(74) *Attorney, Agent, or Firm* — Arent Fox LLP

(57) ABSTRACT

A ceramic electronic component wherein outer electrode is placed over both end portions of a ceramic body. A first coating mainly containing Ni and a second coating containing Sn, solder, or the like are placed on a surface of the outer electrode. The outer electrode includes an end-surface portion and a side-surface turnover portion. The outer electrode includes a glass layer which is placed in a region within at least 5 μm in linear distance L from a covering end portion of the side-surface turnover portion in a direction toward the end-surface portion so as to be in contact with the ceramic body and which contains, at least, Si. The average thickness t of the glass layer is 3 μm to 10 μm. The content of a Si component is 11% by weight or more (preferably 40% by weight or less).

5 Claims, 1 Drawing Sheet

(51) Int. Cl.
    *H01G 4/06*           (2006.01)
    *H01G 4/232*        (2006.01)
    *H01G 4/228*        (2006.01)

(58) Field of Classification Search
    USPC .................................. 361/321.1, 301.4, 305
    See application file for complete search history.

(56) References Cited

U.S. PATENT DOCUMENTS

| | | |
|---|---|---|
| 8,102,641 B2 | 1/2012 | Koga |
| 8,179,660 B2 | 5/2012 | Katsube et al. |
| 2006/0223692 A1* | 10/2006 | Ito ..................... C04B 35/62685                             501/139 |
| 2008/0030921 A1* | 2/2008 | Kaneda ................ H01G 4/1227                             361/272 |
| 2008/0081200 A1 | 4/2008 | Katsube et al. |
| 2009/0169839 A1* | 7/2009 | Sugimoto ............... B32B 18/00                             428/201 |

FOREIGN PATENT DOCUMENTS

| | | |
|---|---|---|
| JP | 9-266129 | 7/1997 |
| JP | 2002208535 A | 7/2002 |
| JP | 2005-179105 A | 7/2005 |
| JP | 2006-263094 A | 9/2006 |
| JP | 2006-339536 A | 12/2006 |
| JP | 2007-103845 A | 4/2007 |
| JP | 2008-071926 A | 3/2008 |
| JP | 2010-073780 A | 4/2010 |
| JP | 2011-204778 A | 10/2011 |

\* cited by examiner

CERAMIC ELECTRONIC COMPONENT

CROSS REFERENCE TO RELATED APPLICATIONS

The present application is a continuation of International application No. PCT/JP2013/053691, filed Feb. 15, 2013, which claims priority to Japanese Patent Application No. 2012-061568, filed Mar. 19, 2012, the entire contents of each of which are incorporated herein by reference.

FIELD OF THE INVENTION

The present invention relates to ceramic electronic components and particularly relates to a ceramic electronic component, such as a monolithic ceramic capacitor, including a ceramic body and outer electrodes placed on both end portions thereof.

BACKGROUND OF THE INVENTION

As electronics has progressed in recent years, the reduction in size and increase in capacity of electronic components such as monolithic ceramic capacitors have advanced rapidly.

For such electronic components, for example, a monolithic ceramic capacitor is usually manufactured in such a way that after an outer electrode conductive paste is applied to both end portions of a component body in which inner electrodes are embedded, outer electrodes are formed by calcination, plated coatings of Ni, Sn, or the like are formed on both end portions of each outer electrode in order to increase the heat resistance or wettability of the outer electrodes, and the outer electrodes are covered with the plated coatings.

Patent Document 1 proposes outer electrodes of an electronic component that each include a first layer in contact with a bare chip including a ceramic sintered body and a second layer placed on the first layer. In each outer electrode, the first layer is made from a conductive paste containing an organic binder, an organic solvent, and a metal resinate dispersed in the organic binder and the organic solvent and the second layer is made from a conductive paste containing a thermosetting resin, an organic solvent, and a metal powder dispersed in the thermosetting resin and this organic solvent.

In Patent Document 1, the conductive contact between the ceramic sintered body (bare chip) and the outer electrode is enhanced with the first layer and a dense metal layer is formed by calcining fine metal particles (metal resinate) so as to prevent the ingress of an electrolyte solution during wet etching. Since the second layer, which is made from the conductive paste as described above, has the good effect of absorbing and dispersing mechanical stress, the electronic component has good plating solution resistance, excellent electrical characteristics, excellent reliability, and excellent mechanical strength.

Patent Document 2 proposes outer electrodes of a chip-type electronic component that are in contact with surfaces of a bare chip including a ceramic sintered body. The outer electrodes are made from a conductive paste containing an organic binder, an organic solvent, and a metal resinate dispersed in the organic binder and the organic solvent.

In Patent Document 2, dense electrode layers are formed by sintering ultrafine metal particles produced by decomposing the metal resinate, whereby the ingress of an electrolyte solution is prevented during wet etching. Since the use of the above conductive paste enables the outer electrodes to be thinly formed, the stress of the outer electrodes to the bare chip is small and therefore cracking is unlikely to occur after packaging. This, as well as Patent Document 1, allows the chip-type electronic component to have excellent electrical characteristics, reliability, and mechanical strength.

Patent Document 1: Japanese Unexamined Patent Application Publication No. 9-190950 (claim 1, paragraphs [0010] to [0012], and the like)

Patent Document 2: Japanese Unexamined Patent Application Publication No. 9-266129 (claim 1, paragraphs [0010] to [0012], and the like)

SUMMARY OF THE INVENTION

However, in Patent Document 1 and 2, there is a problem in that although a plating solution is prevented from permeating the outer electrodes by increasing the denseness of the metal layers forming the outer electrodes even in the case of performing plating after forming the outer electrodes, a ceramic material forming a ceramic body is dissolved in the plating solution by plating. In particular, in the case of performing Ni plating by immersing the ceramic body having the outer electrodes in a Ni plating bath, the ceramic material is likely to be dissolved in a Ni plating solution from side-surface turnover portions of the outer electrodes. The dissolution of the ceramic material in the Ni plating solution may possibly cause a significant reduction in mechanical strength, structural defects such as cracks, and the deterioration of characteristics.

The present invention has been made in view of such circumstances. It is an object of the present invention to provide a ceramic electronic component in which the dissolution of a ceramic body can be suppressed even in the case of plating outer electrodes and which has good mechanical strength.

The inventors have performed intensive investigations in order to achieve the above object and have found that the dissolution of a ceramic material in a plating solution can be suppressed even in the case of performing plating including nickel plating after forming outer electrodes and good mechanical strength can be ensured in such a way that a glass layer is formed in a region within at least 5 μm in linear distance from a covering end portion of an outer electrode in a direction toward an end-surface portion so as to be in contact with a ceramic body and so as to have an average thickness of 3 μm to 10 μm and a Si content of 11% by weight or more.

The present invention has been made on the basis of this finding. A ceramic electronic component according to the present invention includes a ceramic body and outer electrodes which each include an end-surface portion and a side-surface turnover portion and which are each covered over a corresponding one of both end portions of the ceramic body. The outer electrodes each include a glass layer which is formed in a region within at least 5 μm in linear distance from a covering end portion of the side-surface turnover portion in a direction toward the end-surface portion so as to be in contact with the ceramic body and which contains, at least, Si. The average thickness of the glass layer is 3 μm to 10 μm. The content of the Si component in the glass layer is 11% by weight or more.

This allows the dissolution of a ceramic material in a plating solution to be suppressed even in the case of forming a plated coating by plating after forming the outer electrodes, because the outer electrodes have good mechanical strength.

In the ceramic electronic component according to the present invention, the content of the Si component is preferably 40% by weight or less.

In the ceramic electronic component according to the present invention, the outer electrodes preferably each have a surface covered with at least one plated coating including a Ni-based coating mainly containing Ni.

This allows the dissolution of a ceramic material forming the ceramic body in a plating solution to be suppressed even in the case of forming Ni coatings on both end portions of each outer electrode by plating, because the outer electrodes have good mechanical strength.

The ceramic electronic component according to the present invention preferably further includes inner electrodes embedded in the ceramic body.

This allows a small-size, high-capacity multilayer ceramic electronic component, such as a monolithic ceramic capacitor, having good mechanical strength to be obtained.

A ceramic electronic component according to the present invention includes a ceramic body and outer electrodes which each include an end-surface portion and a side-surface turnover portion and which are each placed over a corresponding one of both end portions of the ceramic body. The outer electrodes each include a glass layer which is placed in a region within at least 5 μm in linear distance from a covering end portion of the side-surface turnover portion in a direction toward the end-surface portion so as to be in contact with the ceramic body and which contains, at least, Si. The average thickness of the glass layer is 3 μm to 10 μm. The content of the Si component in the glass layer is 11% by weight or more. Therefore, even in the case of forming Ni coatings by plating after forming the outer electrodes, the dissolution of a ceramic material forming the ceramic body in a plating solution can be suppressed, because the outer electrodes have good mechanical strength.

DETAILED DESCRIPTION OF THE PREFERRED EMBODIMENTS

Embodiments of the present invention will now be described in detail.

Figure 1:
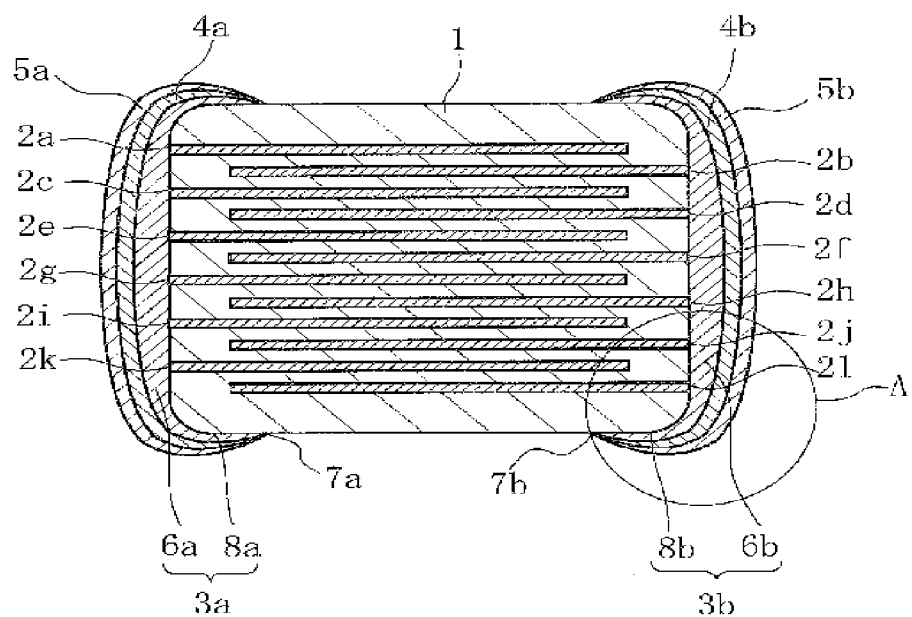
FIG. 1 is a schematic sectional view of an embodiment of a monolithic ceramic capacitor as a ceramic electronic component according to the present invention.

FIG. 1 is a schematic sectional view of an embodiment of a monolithic ceramic capacitor as a ceramic electronic component according to the present invention.

The monolithic ceramic capacitor includes a ceramic body 1 made of a dielectric material mainly containing $BaTiO_3$ or the like, inner electrodes 2a to 2l embedded in the ceramic body 1, outer electrodes 3a and 3b each placed on a corresponding one of both end portions of the ceramic body 1, first plated coatings 4a and 4b, and second plated coatings 5a and 5b, the first and second plated coatings 4a and 5a and the first and second plated coatings 4b and 5b being placed on surfaces of the outer electrodes 3a and 3b, respectively.

Herein, the first plated coatings 4a and 4b each include a Ni-based coating mainly containing Ni in view of an increase in heat resistance. In addition, the second plated coatings 5a and 5b each include a Sn-based coating or the like in view of an increase in wettability.

The outer electrodes 3a and 3b contain, at least, a conductive material and a glass material and include end-surface portions 6a and 6b placed on both end surfaces of the ceramic body 1 and side-surface turnover portions 8a and 8b including covering end portions 7a and 7b linearly extending substantially in parallel to the end-surface portions 6a and 6b. The outer electrodes 3a and 3b are arranged such that the end-surface portions 6a and 6b and the side-surface turnover portions 8a and 8b cover end surfaces and four side surfaces of the ceramic body 1.

The inner electrodes 2a to 2l are arranged in parallel in a stacking direction. Among the inner electrodes 2a to 2l, the inner electrodes 2a, 2c, 2e, 2g, 2i, and 2k are electrically connected to the outer electrode 3a and the inner electrodes 2b, 2d, 2f, 2h, 2j, and 2l are electrically connected to the outer electrode 3b. Electrostatic capacity is formed between each of the inner electrodes 2a, 2c, 2e, 2g, 2i, and 2k and a corresponding one of the inner electrodes 2b, 2d, 2f, 2h, 2j, and 2l.

Figure 2:
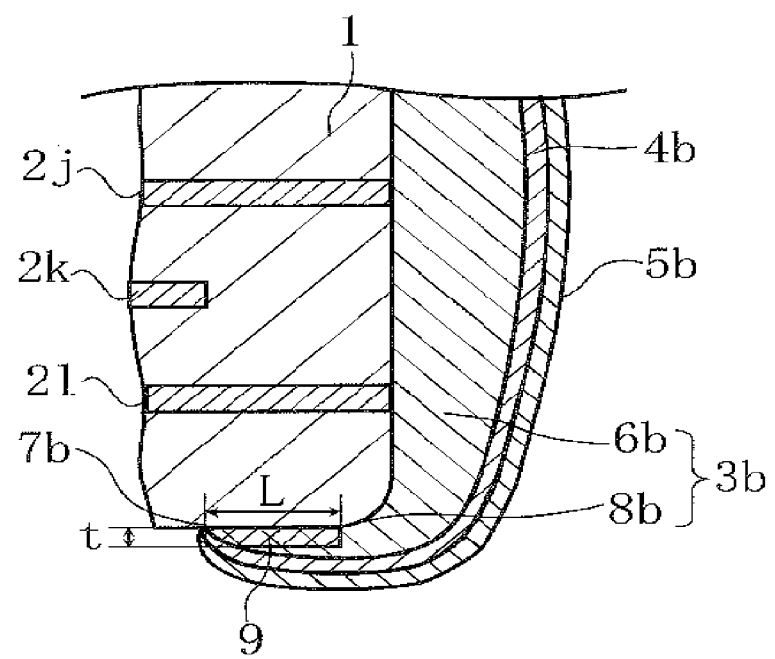
FIG. 2 is an enlarged view of an A-portion of FIG. 1.

FIG. 2 is an enlarged view of an A-portion of FIG. 1. In this embodiment, FIG. 2 shows the vicinity of the side-surface turnover portion 8b of the outer electrode 3b. The vicinity of the side-surface turnover portion 8a of the outer electrode 3a have substantially the same structure.

In the outer electrode 3b, the side-surface turnover portion 8b has a profile sloped from the covering end portion 7b in a direction toward the end-surface portion 6b. In this embodiment, a glass layer 9 is placed in a region within at least 5 μm in linear distance L from the covering end portion 7b of the side-surface turnover portion 8b in a direction toward the end-surface portion 6b so as to be in contact with the ceramic body 1.

The glass layer 9 has an average thickness t of 3 μm to 10 μm and a Si content of 11% by weight or more. This suppresses the dissolution of a ceramic material in a plating solution even in the case of subjecting the ceramic body 1 having the outer electrode 3b to plating including Ni plating.

Reasons for limiting the average thickness t of the glass layer 9 and the content of a Si component in the glass layer 9 to the above ranges are described below in detail.

(1) Average Thickness t of Glass Layers 9

Since the glass layers 9 are placed in the side-surface turnover portions 8a and 8b so as to be in contact with the ceramic body 1, the dissolution of the ceramic material in the plating solution can be suppressed even in the case of performing plating.

However, when the average thickness t of the glass layers 9 is less than 3 μm, the average thickness t is excessively small and therefore it is difficult to sufficiently suppress the dissolution of the ceramic material in the plating solution.

In contrast, when the average thickness t of the glass layers 9 is more than 10 μm, the glass material, which is a non-conductive material, appears on surface layers of the outer electrodes 3a and 3b and particularly the adhesion of the plated coatings to the side-surface turnover portions 8a and 8b may possibly be impaired.

Therefore, in this embodiment, the average thickness t of the glass layers 9 is 3 μm to 10 μm.

(2) Content of Si Component in Glass Layers 9

Since the glass layers 9, which have an average thickness t of 3 μm to 10 μm, are placed in the side-surface turnover portions 8a and 8b so as to be in contact with the ceramic body 1 as described above, the dissolution of the ceramic material in the plating solution can be suppressed.

However, in the case where the molar content of the Si component in the glass layers 9 is reduced to less than 11% by weight, the content of the Si component is excessively low. Therefore, the average thickness t of the glass layers 9 cannot be sufficiently ensured, the dissolution of the ceramic material in the plating solution is insufficiently suppressed, and it is difficult to ensure desired good mechanical strength.

Incidentally, the upper limit of the content of the Si component in the glass layers 9 is not particularly limited and is preferably 40% by weight or less because glass appears on surfaces of the outer electrodes when the content of the Si component in the glass layers 9 is excessively large.

The glass material, which forms the glass layers 9, is not particularly limited and may contain the Si component. In usual, a Si—B glass material mainly containing $SiO_2$ and $B_2O_3$ can be preferably used. Furthermore, the following materials can be used: a Si—B-A (A: alkali metal) glass material containing $SiO_2$ and $B_2O_3$ doped with an alkali metal oxide such as $Li_2O$, $Na_2O$, or $K_2O$; a Si—B—Bi glass material containing $SiO_2$ and $B_2O_3$ doped with $Bi_2O_3$; a Si—B—Zn glass material containing $SiO_2$ and $B_2O_3$ doped with $ZnO_2$; and a Si—B—Zr—Ti glass material containing $SiO_2$ and $B_2O_3$ doped with $ZrO_2$ and $TiO_2$.

The conductive material is not particularly limited and may have good conductivity. In this embodiment, a base metal material such as Cu, Ni, or a Cu—Ni alloy is used in consideration of cost performance.

The monolithic ceramic capacitor can be manufactured as described below.

First, ceramic raw materials such as a Ba compound and a Ti compound are prepared. Predetermined amounts of the ceramic raw materials are weighed. The weighed materials are charged into a ball mill together with pure water and grinding media such as PSZ (partially stabilized zirconia) balls, are sufficiently wet-mixed, are ground, are dried, and are then calcined at a temperature of 900° C. to 1,200° C. for a predetermined time, whereby a calcined powder containing a barium titanate compound and the like is prepared.

Next, the calcined powder is charged into the ball mill again together with an organic binder, an organic solvent, and the grinding media, followed by wet mixing, whereby a ceramic slurry is prepared. The ceramic slurry is formed into ceramic green sheets with a predetermined thickness by a doctor blade process or the like.

Next, a conductive material such as a Ni powder is dispersed in an organic vehicle and is kneaded in a triple-roll mill, whereby an inner electrode conductive paste is prepared.

Herein, the organic vehicle contains an organic solvent and a binder resin dissolved therein and is prepared such that the mixing ratio of the binder resin to the organic solvent is, for example, 1:9 to 3:7 on a volume basis.

The binder resin is not particularly limited and may be, for example, an ethylcellulose resin, a nitrocellulose resin, an acrylic resin, an alkyd resin, or a combination of these resins. The organic solvent not particularly limited and may be α-terpineol, xylene, toluene, diethylene glycol monobutyl ether, diethylene glycol monobutyl ether acetate, diethylene glycol monoethyl ether, diethylene glycol monoethyl ether acetate, or the like. These can be used alone or in combination.

The inner electrode conductive paste preferably contains a dispersant, a plasticizer, or the like as required.

A conductive film with a predetermined pattern is formed on a surface of each of the ceramic green sheets by screen printing using the inner electrode conductive paste.

Next, some of the ceramic green sheets having the conductive films are stacked in a predetermined direction, are sandwiched between the ceramic green sheets having no conductive film, are pressed, and are then cut to a predetermined size, whereby a ceramic multilayer body is prepared. Thereafter, the ceramic multilayer body is degreased at a temperature of 300° C. to 500° C. and is then calcined at a temperature of 1,100° C. to 1,300° C. for about 2 hours in a reducing atmosphere in which the partial pressure of oxygen is controlled to $10^{-9}$ MPa to $10^{-10}$ MPa and which contains an $H_2$—$N_2$—$H_2O$ gas. This allows the conductive films and the ceramic green sheets to be co-sintered, thereby preparing the ceramic body 1 having the inner electrodes 2a to 2l embedded therein.

Next, an outer electrode conductive paste is prepared.

That is, it can be readily produced in such a way that a conductive material, a glass material containing, at least, a Si component, and an organic vehicle are weighed, are mixed at a predetermined mixing ratio, are dispersed, and are kneaded using a triple-roll mill or the like.

The content of the glass material is not particularly limited and is usually adjusted to about 3% to 10% by weight.

The content of the Si component in the glass material may be adjusted such that the content of the Si component in the calcined glass layers 9 is 11% by weight or more and may be adjusted to, for example, 20% to 60% by weight in terms of $SiO_2$.

Incidentally, the organic vehicle may be substantially the same as that used in inner electrode conductive material.

Next, the above outer electrode conductive paste is applied to both end portions of the ceramic body 1 and is then calcined in a reducing atmosphere of $N_2$-air-$H_2O$ or $N_2$—$H_2$—$H_2O$, whereby the outer electrodes 3a and 3b are formed.

Finally, the first plated coatings 4a and 4b, which mainly contain Ni, are formed on surfaces of the outer electrodes 3a and 3b by electroplating and the second plated coatings 5a and 5b, which are made of Sn or the like, are formed on surfaces of the first plated coatings 4a and 4b, whereby the monolithic ceramic capacitor is manufactured.

As described above, in the monolithic ceramic capacitor, the outer electrodes 3a and 3b include the end-surface portions 6a and 6b and the outer electrodes 3a and 3b and are placed on both end portions of the ceramic body 1. In the outer electrodes 3a and 3b, the glass layers 9 are placed in the regions within at least 5 μm in linear distance L from the covering end portions 7a and 7b of the side-surface turnover portions 8a and 8b in a direction toward the end-surface portion 6a or 6b so as to be in contact with the ceramic body 1 and contain, at least, Si. The glass layers 9 have an average thickness t of 3 μm to 10 μm. The content of the Si component in the glass layers 9 is 11% by weight or more. Therefore, even in the case of forming plated coatings such as Ni coatings by plating after the outer electrodes are formed, the dissolution of the ceramic material forming the ceramic body 1 in a plating solution can be suppressed because the outer electrodes 3a and 3b have increased mechanical strength.

The present invention is not limited to the above embodiment. For example, for the regions where the glass layers 9 are placed, the linear distance L from each of the covering end portions 7a and 7b in a direction toward a corresponding one of the end-surface portions 6a and 6b may be at least 5 μm. Thus, the linear distance L from each of the side-surface turnover portions 8a and 8b in a direction toward a corresponding one of the end-surface portions 6a and 6b may be 5 μm or more. In this case, the glass layers 9 are adjusted so as to have an average thickness t of 3 μm to 10 μm and a Si content of 11% by weight or more. Furthermore, the glass layers 9 may be formed in the end-surface portions 6a and 6b as long as characteristics are not affected.

In the above embodiment, the monolithic ceramic capacitor has been exemplified. It can be widely applied to ceramic electronic components each including a ceramic body and outer electrodes that are placed so as to cover end surfaces and four side surfaces of the ceramic body. Needless to say, it can be also applied to single plate-type ceramic capacitors, piezoelectric components, resistors, and the like.

In the above embodiment, the plated coatings have a two-layer structure and may include at least one layer. This applies to a single layer or three or more layers.

Examples of the present invention are described below in detail.

EXAMPLES

[Preparation of Samples]

First, ceramic raw materials such as $BaCO_3$ and $TiO_2$ were prepared. Predetermined amounts of the ceramic raw materials were weighed. The weighed materials were charged into a ball mill together with PSZ balls and pure water, were sufficiently wet-mixed, were ground, were dried, and were then calcined at a temperature of 900° C. to 1,200° C. for a predetermined time, whereby a calcined powder containing a barium titanate compound and the like was prepared.

Next, the calcined powder was charged into the ball mill again together with an organic binder, an organic solvent, a plasticizer, a dispersant, and the PSZ balls, followed by wet mixing, whereby a ceramic slurry was prepared. The ceramic slurry was formed into ceramic green sheets by a doctor blade process such that the thickness after drying was 4.0 μm.

Next, an inner electrode conductive paste was prepared by a method below.

That is, 50% by weight of a Ni powder with an average particle size of 0.3 μm, 45% by weight of an organic vehicle, and the remainder consisting of a dispersant and a thickening agent were mixed together such that the Ni powder, the dispersant, and the thickening agent were dispersed in the organic vehicle, followed by kneading in a triple-roll mill or the like, whereby the inner electrode conductive paste was prepared.

The organic vehicle used herein was one prepared by dissolving 10% by weight of an ethylcellulose resin (organic binder) in butylcarbitol (organic solvent).

Next, a conductive film with a predetermined pattern was formed on a surface of each of the ceramic green sheets by screen printing using the inner electrode conductive paste such that the film thickness after drying was 2.0 μm.

Next, 350 of the ceramic green sheets having the conductive films were stacked in a predetermined direction, were sandwiched between the ceramic green sheets having no conductive film, were pressed, and were then cut to a predetermined size, whereby ceramic multilayer bodies were prepared. Thereafter, the ceramic multilayer bodies were degreased at a temperature of 400° C. for 10 hours and were then calcined at a temperature of 1,200° C. for about 2 hours in a reducing atmosphere in which the partial pressure of oxygen was controlled to $10^{-9}$ MPa to $10^{-10}$ MPa and which contained an $H_2$—$N_2$—$H_2O$ gas. This allowed the conductive films and the ceramic green sheets to be co-sintered, thereby preparing ceramic bodies each having inner electrodes embedded therein.

Next, an outer electrode conductive paste was prepared by a method below.

That is, a Cu powder with an average particle size of 0.3 μm, zinc borosilicate glass frit having a $SiO_2$ content of 10% to 60% by weight, and an organic vehicle were weighed so as to account for 70% by weight, 3% to 20% by weight, and 10% to 27% by weight, respectively; were mixed such that the Cu powder and the zinc borosilicate glass were dispersed in the organic vehicle; and were kneaded in a triple-roll mill, whereby the outer electrode conductive paste was prepared.

The organic vehicle used herein was one prepared by dissolving 20% by weight of an ethylcellulose resin in butylcarbitol.

Next, the outer electrode conductive paste was applied to both end portions of each ceramic body by a dipping process such that the film thickness near the center on an end-surface side was 50 μm after drying, followed by drying. Thereafter, the ceramic body was calcined at a maximum temperature of 900° C. in a reducing atmosphere of an $N_2$—$H_2$—$H_2O$ gas at an oxygen partial pressure corresponding to an electromotive force (oxygen electromotive force) of 240 mV to 950 mV, whereby outer electrodes were formed so as to cover two end surfaces and four side surfaces of the ceramic body.

Next, a Ni coating (first plated coating) and a Sn coating (second plated coating) were formed on each of the outer electrodes in that order by electroplating, whereby samples (monolithic ceramic capacitors) with Sample Nos. 1 to 6 were prepared.

Incidentally, outside dimensions of each sample prepared as described above were 3.2 mm long, 1.6 mm wide, and 1.6 mm thick.

[Evaluation of Samples]

(Average Thickness t of Glass Layer)

A cross-sectional portion corresponding to a side-surface turnover portion each of the samples with Sample Nos. 1 to 6 was irradiated with a focused ion beam (FIB), whereby surfaces of the samples were polished. Each sample was irradiated by scanning ion microscopy (SIM) and secondary electrons emitted in this manner were measured, whereby a surface of the sample was observed. The area A of a glass layer formed in a region within 5 μm in linear distance from a covering end portion in a direction toward an end-surface portion was calculated from a SIM image and the average thickness t of the glass layer was determined by Equation (1).

$$t=A/5 \tag{1}$$

(Content of Si in Glass Layer)

A cross-sectional portion corresponding to a side-surface turnover portion each of the samples with Sample Nos. 1 to 6 was irradiated with an FIB in substantially the same way as that described above, whereby surfaces of the samples were polished. Arbitrary three sites in the cross-sectional portion were measured for Si content using a transmission electron microscope (TEM-EDS) and the average was determined.

(Incidence of Structural Defects)

Each of the samples with Sample Nos. 1 to 6 was soldered to a surface of a glass epoxy substrate and was subjected to a deflection test. That is, 20 of the samples with Sample Nos. 1 to 6 were each loaded at a rate of 1.0 mm/s and were held for 5 seconds after the deflection reached 1.5 mm. A cross section of each held sample was polished. The polished was observed, whether structural defects such as cracks were present was determined, and the incidence of the structural defects was calculated.

Table 1 shows the content of a glass material in the outer electrode paste used to prepare the samples with Sample Nos. 1 to 6, the content of $SiO_2$ in the glass material, the average thickness t of each glass layer, the Si content of the glass layer, and the incidence of structural defects.

TABLE 1

| Sample No. | Content of SiO$_2$ in glass frit (weight percent) | Content of glass frit in conductive paste (weight percent) | Oxygen electromotive force (mV) | Average thickness t of glass layer (μm) | Content of Si in glass layer (weight percent) | Incidence of structural defects (%) |
|---|---|---|---|---|---|---|
| 1* | 10 | 3 | 240 | 2 | 5 | 10 |
| 2* | 15 | 3 | 240 | 2 | 7 | 5 |
| 3 | 20 | 3 | 750 | 3 | 13 | 0 |
| 4 | 20 | 5 | 240 | 3 | 11 | 0 |
| 5 | 60 | 10 | 900 | 10 | 40 | 0 |
| 6* | 60 | 20 | 950 | 20 | 41 | — |

Asterisked samples are outside the scope of the present invention.

As is clear from Table 1, in Sample No. 1, the average thickness t of a glass layer is 2 μm and the content of Si in the glass layer is 5% by weight; hence, the incidence of structural defects is high, 10%.

In Sample No. 2, while the content of Si in a glass layer is 7% by weight and is slightly increased as compared to Sample No. 1, the average thickness t of the glass layer is 2 μm; hence, the incidence of structural defects is 5%. Incidentally, the reason why Sample No. 2 is lower in the incidence of structural defects as compared to Sample No. 1 is probably that the content of SiO$_2$ in a glass material is 15% by weight and is increased as compared to Sample No. 1. That is, it is conceivable that the incidence of structural defects is slightly increased by increasing the content of SiO$_2$.

On the other hand, in Sample No. 6, the average thickness t of a glass layer is large, 20 μm, and a glass material appeared on surface layers of outer electrodes; hence, plated coatings were incapable of being sufficiently formed and therefore the deflection test was not performed.

In contrast, in Sample Nos. 3 to 5, the average thickness t of each glass layer and the content of Si in the glass layer are 3 μm to 10 μm and 11% by weight or more, respectively, and are within the scope of the present invention; hence, it is clear that structural defects such as cracks are not caused and good mechanical strength is achieved.

As is clear from Sample Nos. 3 to 5, the thickness t of the glass layer can be controlled to 10 μm or less by adjusting the content of Si in the glass layer.

It can be avoided that a ceramic material forming a ceramic body is dissolved in a plating solution from side-surface turnover portions of outer electrodes; hence, good mechanical strength can be ensured.

REFERENCE SIGNS LIST

1 Ceramic body
2a to 2l Inner electrodes
3a and 3b Outer electrodes
4a and 4b First plated coatings (plated coatings)
5a and 5b Second plated coatings (plated coatings)
6a and 6b End-surface portions
7a and 7b Covering end portions
8a and 8b Side-surface turnover portions

The invention claimed is:

1. A ceramic electronic component comprising:
a ceramic body having opposed end portions; and
outer electrodes each respectively covering one of the opposed end portions of the ceramic body, each outer electrode including:
an end-surface portion;
a side-surface turnover portion; and
a glass layer in contact with the ceramic body in a region within at least 5 μm in linear distance from a covering end portion of the side-surface turnover portion and extending in a direction toward the end-surface portion, and which contains, at least, Si, wherein
the glass layer is non-conductive;
an average thickness of the glass layer is 3 μm to 10 μm; and
a content of the Si in the glass layer is 11% to 40% by weight.

2. The ceramic electronic component according to claim 1, further comprising at least a first plated coating including a Ni-based coating mainly containing Ni on the outer electrodes.

3. The ceramic electronic component according to claim 2, further comprising at least a second plated coating including a Sn-based coating on the first plated coating.

4. The ceramic electronic component according to claim 1, further comprising inner electrodes within the ceramic body.

5. The ceramic electronic component according to claim 1, wherein a material of the glass layer is selected from the group consisting of a Si—B glass material, a Si—B-A glass material, wherein A is an alkali metal, a Si—B—Bi glass material, a Si—B—Zn glass material, and a Si—B—Zr—Ti glass material.

* * * * *